(12) United States Patent
Sabbatino

(10) Patent No.: US 7,507,036 B2
(45) Date of Patent: Mar. 24, 2009

(54) CONNECTION ARRANGEMENT FOR OPTICAL COMMUNICATION SYSTEMS

(75) Inventor: Salvatore Sabbatino, Turin (IT)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 730 days.

(21) Appl. No.: 10/809,298

(22) Filed: Mar. 25, 2004

(65) Prior Publication Data

US 2005/0213895 A1  Sep. 29, 2005

(51) Int. Cl.
*G02B 6/36* (2006.01)
*G02B 6/12* (2006.01)

(52) U.S. Cl. .......................................... 385/92; 385/14

(58) Field of Classification Search .................. 385/14, 385/92
See application file for complete search history.

(56) References Cited

U.S. PATENT DOCUMENTS

| | | | | |
|---|---|---|---|---|
| 3,887,882 A | * | 6/1975 | Smith | ........................... 372/83 |
| 4,204,742 A | * | 5/1980 | Johnson et al. | ................ 385/23 |
| 5,110,216 A | * | 5/1992 | Wickersheim et al. | ....... 374/122 |
| 6,919,387 B2 | * | 7/2005 | Fujieda et al. | ............... 523/137 |
| 2004/0146452 A1 | * | 7/2004 | Fujieda et al. | ............ 423/447.2 |
| 2004/0234417 A1 | * | 11/2004 | Schienle et al. | ........... 422/82.08 |
| 2005/0140539 A1 | * | 6/2005 | Fujieda et al. | .................. 342/1 |

FOREIGN PATENT DOCUMENTS

JP        02003229632   *  8/2006

OTHER PUBLICATIONS

Article entitled, "Eccosorb FGM-40."

* cited by examiner

*Primary Examiner*—K. Cyrus Kianni

(57) ABSTRACT

An arrangement including:
 an electrical subassembly,
 an optical subassembly,
 the electrical subassembly and the optical subassembly having an associated electrical connection including at least one electrical lead extending therebetween, and
 an electrically non-conductive electromagnetic absorber body arranged to at least partly cover the electrical lead.

3 Claims, 2 Drawing Sheets

Figure 3:
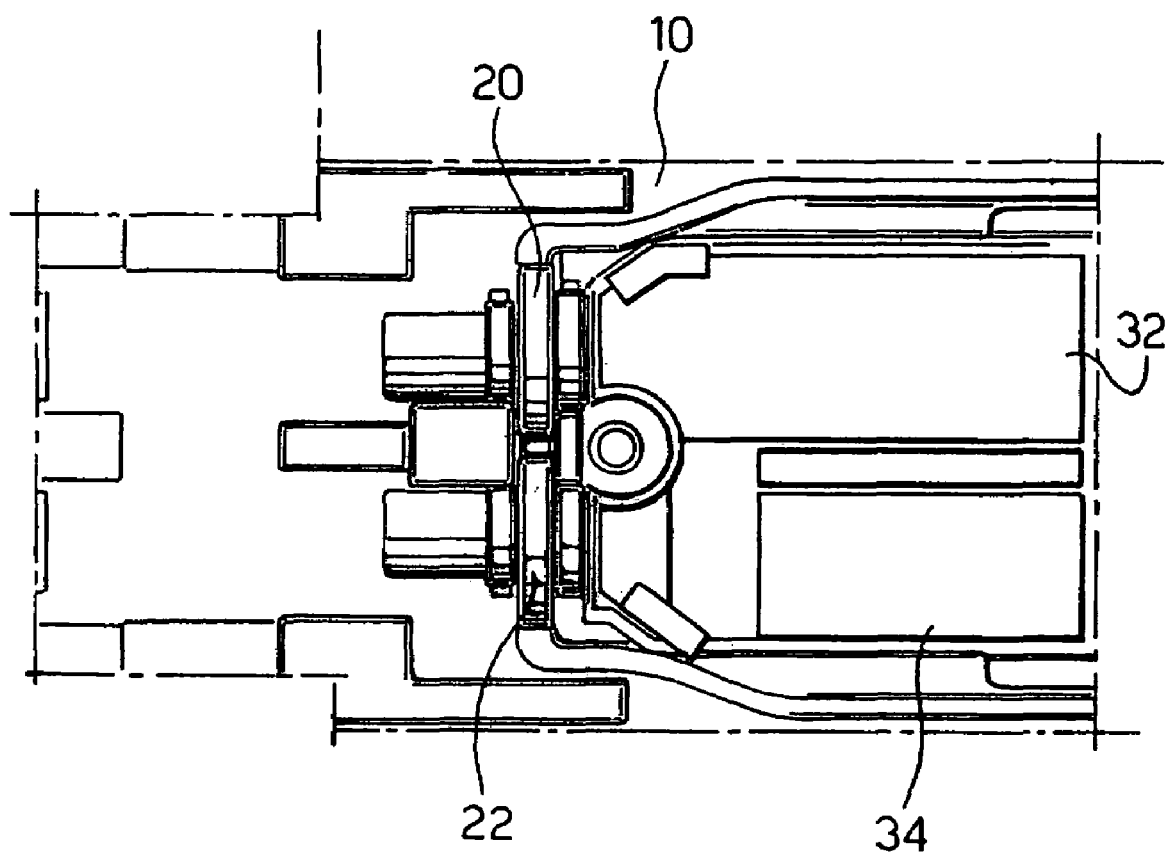

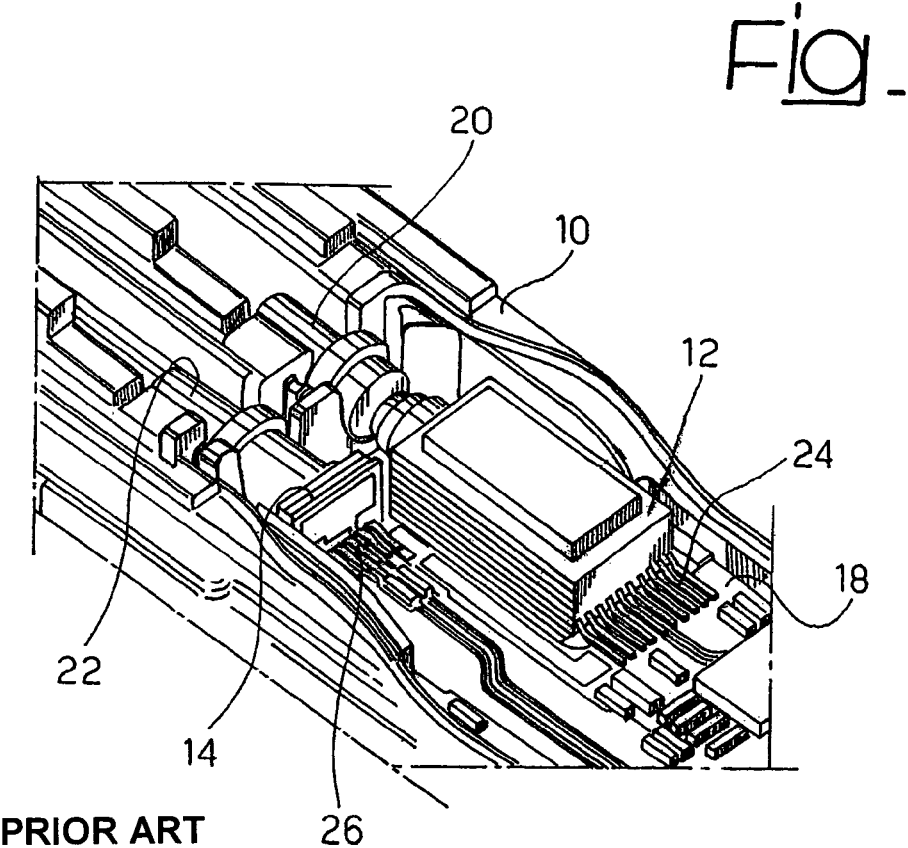
Fig_1
PRIOR ART
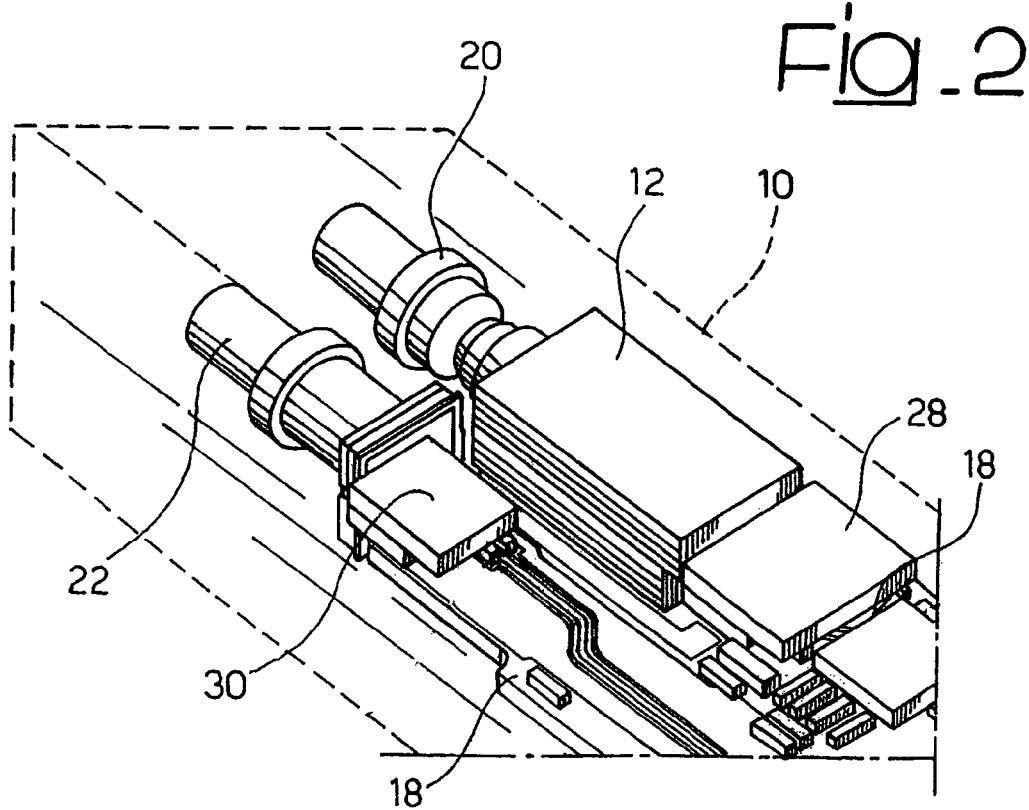
Fig_2

CONNECTION ARRANGEMENT FOR OPTICAL COMMUNICATION SYSTEMS

FIELD OF THE INVENTION

The present invention relates to optical communication systems such as fiber optic communication systems.

DESCRIPTION OF THE RELATED ART

Transmission bit-rates of 10 Gb/s are now current in optical data communication systems and higher bit-rates are expected to become current in the future.

At these operational speeds, using metallic leads to carry electrical signals between optical and electrical subassemblies may appreciably affect radio-frequency (RF) performance. This is particularly true in fiber optic transceivers where large volumes of data are aggregated to produce a very high speed serial data stream, which is then used to drive a light source, e.g. a laser.

Additionally, at very high operational speeds, low cost and/or small dimension requirements imposed on apparatus give rise to significant problems in terms of electromagnetic immunity (EMI), electromagnetic compatibility (EMC), RF management and signal integrity.

At 10 Gb/s and higher, the existing solutions for connecting the optical subassemblies (OSAs) and the electrical subassembly (ESA) in a fiber optic transceiver primarily aim at minimizing the interconnection loss. Exemplary of such prior art solutions is the use of a flexible printed circuit board (PCB). This is oftentimes referred to as a "flex".

Using a flex generally improves RF performance of the interconnection. However, implementing this solution is time consuming in view of the need of attaching the flex to the ESA and the OSA. Moreover, the flex is not self-protected from crosstalk (X-Talk) and is not exempt from EMC problems.

OBJECTS AND SUMMARY OF THE INVENTIONS

A basic object of the invention is to provide an improved solution dispensing with the problems inherent in such prior art arrangement as the use of a "flex" discussed in the foregoing.

A specific object of the invention is to provide an improved solution dispensing with crosstalk developed between transmitter and receiver in an optical communication environment (e.g. in a fiber optic transceiver). Essentially, crosstalk is due to the electromagnetic field irradiated from the transmitter (receiver) and picked up by the receiver (transmitter).

Another object of the invention is to provide an arrangement improved in terms of RF-performance of the OSA-to-ESA interconnections: these being usually comprised of a so-called lead frames in air causes these interconnections to exhibit an undesirably high impedance.

Still another object of the invention is to provide an arrangement improved in terms of electromagnetic immunity (EMI) of the RF-paths.

A still further object of the invention is to provide an arrangement improved in terms of electromagnetic compatibility (EMC) of e.g. a transceiver.

An additional object of the invention is to provide an arrangement that jointly achieves all the objects considered in the foregoing.

A preferred embodiment of the invention is thus based on the use of a lead frame in conjunction with electromagnetic absorber material. Electrical connection of the OSAs and the ESA is ensured by means of metallic leads. These leads are easy to produce while simultaneously easy and fast to solder to the ESA.

As indicated, crosstalk and other problems related to EMC and EMI are primarily related to emissions of electromagnetic fields from the leads and/or to electromagnetic fields picked up by the leads. More specifically, crosstalk is due to the electromagnetic field irradiated from the transmitter (receiver) and picked up by the receiver (transmitter). The influence of these fields is drastically reduced by the absorber material. Using the absorber material on both the receiver (RX) and the transmitter (TX) side will drastically reduce electromagnetic emissions. Due to the absorbing properties of the material, these electromagnetic emissions are converted into thermal power, which is easily dissipated.

Additionally, the absorber material reduces the discontinuity in the electrical path generated when leads in air are used as well as the relative difference of characteristic impedance of the lead zone. The absorber material has a dielectric constant higher than air and thus closer to the dielectric constant of the PCB and the feed throughs of the OSAs.

RF-performance of the interconnection will be improved using the absorber, because the dielectric constant of the material is highly beneficial in reaching the desired characteristic impedance. Without an absorber material, a frame comprised of leads in air will typically have an impedance higher than the desired impedance. At least partly embedding the leads in an absorber material reduces the impedance and thus leads to improved performance.

From the viewpoint of EMI/EMC, the absorber material represents a way to increase immunity and compatibility in apparatus such as a transceiver. The electromagnetic emissions otherwise likely to be picked up by equipment around the transceiver will be shielded by the external protections of the transceiver and eventually absorbed internally to the module. Additionally, leakage of electromagnetic fields from the transceiver towards the surrounding environment will be drastically reduced because a large portion of them is absorbed internally to the module.

BRIEF DESCRIPTION OF THE ANNEXED DRAWINGS

The invention will now be described, by way of example only, by referring to he annexed figures of drawing, wherein:

FIG. 1 is a schematic perspective view of a transceiver for fiber optic communications, FIG. 2 is a schematic perspective view of the transceiver shown in FIG. 1 showing the application of absorber elements as described herein, and FIG. 3 shows other parts of a transceiver adapted to be provided with absorber elements as described herein.

DETAILED DESCRIPTION OF PREFERRED EMBODIMENTS OF THE INVENTION

As used herein "electromagnetic absorber material" will indicate any material exhibiting the capability of absorbing electromagnetic fields/waves. More specifically, electromagnetic fields/waves in the typical ranges of interest for fiber optic communications (i.e. 30 MHz to 20 GHz) will be primarily considered. More to the point, electrically non-conductive (i.e. insulating) absorber materials will be considered.

Such materials are currently available for use as free space absorbers, cavity resonance absorbers or load absorbers in microwave products. Typical formulations include magnetically loaded, flexible silicone or urethane sheets. Alternative arrangements include variations in the loading material, such as e.g. iron loaded, ferrite loaded or dielectrically loaded materials (which may exhibit resonant properties) and/or variations in the sheet structure, such as e.g. multilayered, carbon impregnated polyurethane foam sheets, open cell foam sheets with controlled conductivity gradient, vinyl plastic or silicone rubber sheets.

Absorber material particularly suitable for use in the invention is available as ECCOSORB® FGM-40 from EMERSON & CUMING MICROWAVE PRODUCTS, INC. of Randolph, Mass.

FIG. 1 is a prospective view of a transmitter/receiver (transceiver) for fiber optic communications.

The arrangement shown is essentially comprised of a casing or enclosure 10 where optical subassemblies (OSAs) 12 and 14 are provided on the transmitter side and the receiver side of the transceiver, respectively.

Reference numeral 18 designates a so-called electrical subassembly (ESA) onto which the OSAs 12 and 14 are mounted.

Reference numerals 20 and 22 designate optical couplers ensuring optical coupling of the OSAs 12 and 14 with transmitter and receiver fibers (non shown) associated with the transceiver.

Electrical connection between the OSAs 12 and 14 and the ESA 18 is ensured by so-called lead frames 24, 26. Each frame is comprised of a plurality of metallic leads adapted to carry electrical signals.

The arrangement shown in FIG. 1 is conventional in the art and essentially corresponds to the transceiver designated Espresso/XFP™ commercially available with the assignee company.

Those of skill in the art will also appreciate that reference to this basic arrangement is of purely exemplary nature. The improved arrangement described herein may be used advantageously in connection with basic arrangements substantially different from the one shown in FIG. 1. Just by way of example, reference can be made to arrangements including only one OSA connected with an associated ESA thus producing a fiber optic communication system comprised either of a transmitter or a receiver.

FIG. 2 reproduces the same basic arrangement of FIG. 1 where the casing 10 has been shown in shadow lines only for the sake of ease and clarity of representation. In FIG. 2, parts/components identical or equivalent to those already described in connection with FIG. 1 are designated by the same reference numerals.

In FIG. 2, references numerals 28 and 30 designate two elements comprised of an electrically non-conductive electromagnetic absorber material as defined in the introductory portion of this detailed description.

In the exemplary embodiment shown, the elements 28 to 30 are in the form of plate-like elements cut out of a sheet of absorber material having a thickness of e.g 1 millimeter. Reference to that specific thickness is of exemplary nature of course.

The dimensions (plan area) of the elements 28 and 30 will be generally conformed to the size of the lead frames onto which the elements 28 and 30 are located.

In typical arrangements, the lead frame 24 interposed between the ESA 18 and the transmitter OSA will be generally larger (essentially, will include a larger number of leads) then the lead frame 26 associated with the receiver OSA 14. Accordingly the element 28 will be generally larger then the element 30, in order to ensure that the leads in the lead frames 24 and 26 are properly covered by the absorber material comprising the elements 28 and 30.

As result of being interposed between the absorber elements 28 and 30 and the underlying printed circuit board 18 (essentially comprised of a dielectric material), the leads included in the lead frames 24 and 26 will be at least partly, covered by the absorber elements 28, and 30.

Experiments carried out by the inventor have shown that—in a thoroughly surprising and unexpected manner—such covering effect of the leads by the absorber elements 28 and 30 results in improved performance in terms of immunity to crosstalk, RF management, electromagnetic immunity, electromagnetic compatibility and resulting signal integrity.

Even without wishing to be bound to any specific field in that respect, the inventor believes that such unexpected effect is due to the simultaneous presence, and synergic effect within the electrically non-conductive electromagnetic absorber materials considered, of components (e.g. magnetic, iron, ferrite or dielectric loading) adapted to ensure electromagnetic immunity and electromagnetic compatibility due to the absorbing action in respect of electromagnetic fields/waves—and the isolating matrix (silicon, urethane, vinyl plastic or silicon) into which such loading material is dispersed. Such matrix presumably acts as a sort of "sheath" that appreciably increases performance in terms of RF management and signal integrity due to the higher dielectric constant of such material in comparison with air.

The resulting sheating effect effectively reduces the discontinuity in the electrical path in comparison with the situation arising when leads in air are used, thus notional dispensing with the relative difference of characteristic impedance in the lead zone.

It will of course be appreciated that using the same material for the elements 28 and 30 is a preferred solution for the sake of simplicity, but is not a mandatory requirement.

Additionally, it will be appreciated that "covering" of the lead frames by the absorber material does in no way require direct exposure/contact of the absorber material to the metallic leads. As used herein, covering/coverage encompasses arrangements where other materials are arranged between the leads and the absorber material, while preserving the co-extensive nature of the metallic lead(s) and the absorber material.

As shown in FIG. 3, use of absorber materials as disclosed in the foregoing can be easily extended to other areas/portions of a fiber optic system.

FIG. 3 is essentially a top plan view of the arrangement shown in FIG. 1 where only the optical couplers 20 and 28 were left in place in order to better visualize the portion of the casing 10 underlying the areas where the OSAs 12 and 14 and the ESA 18 are located.

In FIG. 3, reference numerals 32 and 34 indicate two elements essentially comprised of a sheet-like, electrically non-conductive electromagnetic absorber material arranged in order to cover the areas of the casing 10 where the OSAs 12 and 14 and the ESA 18 are located.

Adoption of the arrangement shown in FIG. 3 (preferably in combination with the presence of the elements 28 and 30) further emphasizes the beneficial effects of the arrangement described herein in terms of electromagnetic immunity, electromagnetic compatibility, RF management, signal integrity and crosstalk sensitivity. Using the absorber elements 28 and 30 of FIG. 2 together with the absorber elements 32 and 34 of FIG. 3 leads to both lead frames 24 and 26 being covered on both sizes in fact sandwiched between electrically non-conductive electromagnetic absorber material.

Although the invention has been described with a certain degree of particularity, it is understood that the present description has been made only by way of example and that numerous changes in the details of construction and the combination and arrangement of parts may be resorted to without departing from the spirit and scope of the invention.

What I claim is:

1. An arrangement including:
   an electrical subassembly,
   an optical subassembly,
   said electrical subassembly and said optical subassembly having an associated electrical connection including at least one electrical lead extending therebetween,
   at least electrically non-conductive absorber body arranged to at least partly cover said at least one electrical lead, and
   a dielectric support board, wherein said electrical connection extends over said support board and said at least one electrical lead is arranged between said absorber body and said support board.

2. The arrangement of claim 1, including at least one further electrically non-conductive electromagnetic absorber body associated with said supporting board, wherein said at least one electrical lead is sandwiched between said at least electrically non-conductive absorber body and said at least one further electrically non-conductive electromagnetic absorber body.

3. An arrangement including:
   an electrical subassembly,
   an optical subassembly,
   said electrical subassembly and said optical subassembly having an associated electrical connection including at least one electrical lead extending therebetween
   at least electrically non-conductive absorber body arranged to at least partly cover said at least one electrical lead, and
   a further optical subassembly and a further electrical connection between said electrical subassembly and said further optical subassembly, said further electrical connection including at least one further electrical lead, the arrangement including at least one further electrically non-conductive electromagnetic absorber body arranged to at least partly cover said at least one further electrical lead.

\* \* \* \* \*